United States Patent [19]
Van Den Eynde et al.

[11] Patent Number: 6,117,459
[45] Date of Patent: Sep. 12, 2000

[54] FILTRATION ADJUVANTS, FILTRATION SUPPORTS, FILTRATION PROCESS USING THEM AND PROCESS FOR REGENERATING SAID ADJUVANTS

[75] Inventors: Erik Van Den Eynde, Winksele; Jacques Hermia, Walhain; Georges Rahier, Liege, all of Belgium

[73] Assignees: Interbrew, Belgium; Krontec SA, Luxembourg, Luxembourg

[21] Appl. No.: 08/952,142

[22] PCT Filed: May 10, 1996

[86] PCT No.: PCT/IB96/00440

§ 371 Date: Jan. 12, 1998

§ 102(e) Date: Jan. 12, 1998

[87] PCT Pub. No.: WO96/35497

PCT Pub. Date: Nov. 14, 1996

[30] Foreign Application Priority Data

May 12, 1995 [FR] France ................................ 95 05636

[51] Int. Cl.[7] .............................. C12C 11/00; C12C 7/00; C12C 7/28
[52] U.S. Cl. .................................. 426/7; 426/7; 426/12; 435/220; 435/221; 210/777; 210/778; 210/741; 210/193; 210/792; 210/797; 210/269
[58] Field of Search .................................. 210/777, 778, 210/741, 193, 792, 797, 269; 435/221, 220; 426/7, 12

[56] References Cited

U.S. PATENT DOCUMENTS

| | | | |
|---|---|---|---|
| 3,220,928 | 11/1965 | Brenner | 195/2 |
| 3,550,774 | 12/1970 | Hirs et al. | 210/67 |
| 4,028,255 | 6/1977 | Bolto et al. | 210/500 |
| 4,350,620 | 9/1982 | Hartinger et al. | 252/628 |
| 4,820,420 | 4/1989 | Hums et al. | 210/669 |
| 5,801,051 | 9/1998 | Kiefer et al. | 435/262 |

FOREIGN PATENT DOCUMENTS

| | | |
|---|---|---|
| 064620 | 11/1982 | European Pat. Off. . |
| 253233 | 1/1988 | European Pat. Off. . |
| 91870168 | 10/1990 | European Pat. Off. . |
| 483099 | 4/1992 | European Pat. Off. . |
| 611249 | 8/1994 | European Pat. Off. . |
| 4125594 | 6/1992 | Germany . |
| 937354 | 6/1995 | South Africa . |
| 867613 | 5/1961 | United Kingdom . |
| 2190603 | 11/1987 | United Kingdom . |
| 2239401 | 7/1991 | United Kingdom . |

OTHER PUBLICATIONS

Hardwick, William A., Handbook of Brewing, p. 325–326, 1995.

Varnum, Alan, H. and Jane P. Sutherland, Beverages—Technology, Chemistry and Microbiology, p. 324–325, 1994.

Boschet, Gianmario, Stabilization of Beer With the Use of PVPP and Silicon Gel Products, Bios, vol. 17, No. 8–9, pp. 49–52 (Translation), Aug. 1986.

Schafft, H., N. Mums and G. Muller, PVPP Recycling For Beer Stabilization, Brauwelt, p. 1376–1378, 1380–1382 (Translation), Sep. 1977.

Donhauser, S., D. Wagner and C. Waubke, Beer Filtration Without Kieselguhr, Brauwelt, vol. 42, p. 1838–1841, 1844, 1846 (Translation), 1988.

Abstract of Czech Patent No. 227470, vol. 105, No. 17, Oct. 27, 1986, "Pulverised Polyamide Sorbent Based on Lignin", By Kralicek et al., p. 567.

Abstract of Russian Patent No. 270739, vol. 73, No. 19, Nov. 9, 1970, "Lactams", By Moskovich, p. 331.

Japanese Patent Abstract No. 3169311, vol. 15, No. 409 (C–0876), Oct. 18, 1991, "Multilayer Filter Cartridge", By Teisho.

*Primary Examiner*—Keith D. Hendricks
*Assistant Examiner*—Philip DuBois
*Attorney, Agent, or Firm*—Bachman & LaPointe, P.C.

[57] ABSTRACT

The invention relates to new regenerable filtration adjuvants which are usable for the filtration of liquids, particularly beer at the end of the secondary fermentation storage, characterized in that they comprise synthetic or natural incompressible polymer grains or natural incompressible grains grains having a sphericity coefficient varying between approximately 0.6 and 0.9. The invention also relates to a method for regenerating a filtration adjuvant.

13 Claims, No Drawings

000
FILTRATION ADJUVANTS, FILTRATION SUPPORTS, FILTRATION PROCESS USING THEM AND PROCESS FOR REGENERATING SAID ADJUVANTS

This application is a 371 of PCT/IB96/00440 filed on May 10, 1996.

BACKGROUND OF THE INVENTION

The present invention concerns new filtration adjuvants, usable in the filtration of liquids, particularly beer at the end of the secondary fermentation storage. It also concerns a new filtration method using said new filtration adjuvants. It finally concerns a new method of regeneration in situ of said filtration adjuvants and new filtration supports.

Filtration adjuvants are substances used in solid-liquid separation in which a deposit is formed on a filter screen or a filter support, either alone or mixed with the substances to be retained, and procure efficient separation by primarily mechanical means.

The various types of filtration adjuvant can be distinguished by their main ingredients.

The type of filtration adjuvant most frequently used in brewing is kieselguhr, comprising mainly calcined diatoms.

Other types of filtration adjuvants include perlite obtained from volcanic rock, starch, cellulose and fibrous polymer synthetic materials.

During filtration, these various filtration adjuvants form a porous medium trapping the impurities to be eliminated and facilitating the flow of the liquid phase.

The filtration adjuvants described above can be used either in the so-called pre-layer technique or in the so-called "alluvion" technique.

One industrial sector in which filtration adjuvants are used is brewing.

Most commercially produced beers must have a bright color and be free of micro-organisms. These requirements are generally complied with when the beer has an E.B.C. (European Brewing Convention) clarity value less than 0.5° EBC and a micro-organism content less than five yeasts per liter.

The E.B.C. clarity values and their assessment are defined in the publication: Analytica-E.B.C., 4th Ed., 1987, Revue de la Brasserie et des Boissons Ed., Zurich.

Until now the most economic and efficient method of obtaining these values has been to use a filtration adjuvant in making the beer.

After it has matured in secondary fermentation storage tanks, the beer must be clarified and filtered before it is packaged in order to eliminate a number of impurities, including colloidal material that makes it cloudy and yeast. After filtration the beer has a bright color and sufficient stability for an adequate shelf life.

Beer is usually filtered using filtration adjuvants and one of the following two techniques, namely "mass" filtration or "alluvion" filtration, the latter requiring a preliminary layer to be formed beforehand.

"Alluvion" filtration, by far and away the more commonly used technique, consists in depositing onto the filter medium, prior to filtration proper, a first preliminary layer of coarse filtration adjuvant to protect the filtration support (for example multiple tube filters or plate filters) and to facilitate demounting of the filter after filtration and cleaning of the filtration support. A second preliminary layer of filtration adjuvant similar in size to that used for "alluvion" filtering is frequently deposited in order to obtain a clear filtrate as soon as the filtration cycle starts.

In "alluvion" filtration, the filtration adjuvant is mixed with the beer before it is filtered and forms a suspension. During filtration this suspension forms a mixed cake containing impurities and the filtration adjuvant.

When the filtration cycle is finished, the filtration adjuvant cake containing the trapped impurities, in particular the yeasts, is eliminated in the form of a thick suspension generally referred to as slurry ("bourbe").

When multiple tube filters are used to carry out the filtration, a counterflow of a pressurized gas-water emulsion through the filter medium detaches the cake from the filter medium. It drops to the bottom of the filtration tank, where it is recovered.

If horizontal plate filters are used to carry out the filtration, the cake is eliminated by the centrifugal force produced by rotating the filter plates.

In "mass" filtration, the filtration adjuvant is deposited directly onto the filter support before the beer is filtered.

Using filtration adjuvants, especially kieselguhr, has a number of drawbacks, however.

One of the main drawbacks is that the filtration adjuvant can be used for only one filtration cycle.

The brewer is then obliged to discard the filtration adjuvant, in particular the kieselguhr, and to use a new amount of fresh filtration adjuvant. The environmental problems associated with this waste are readily apparent, quite apart from the additional cost of the end product related to the regular supply of fresh filtration adjuvants.

Techniques have therefore been considered for regenerating the filtration adjuvant, in particular kieselguhr, but they have not met all the requirements of the industry.

Current techniques for regenerating filtration adjuvants, in particular kieselguhr, succeed in only partial regeneration. The brewer is therefore obliged to add a certain amount of fresh filtration adjuvant on each new filtration cycle, to compensate for the loss in filtration efficiency due in particular to the increased quantity of impurities present, or even to discard the partially regenerated filtration adjuvant after several filtration cycles, with the problems already mentioned.

What is more, these processes require the use of special-purpose installations separate from the filtration installations. They therefore give rise to major investment and operating costs, in particular the cost of transporting the filtration adjuvant to the regeneration site.

Research has been carried out with the aim of developing a filtration adjuvant that can be regenerated and that solves the problems described above. One proposed filtration adjuvant of this type consists of spherical balls of synthetic material that can be regenerated in existing filtration installations. However, this filtration adjuvant is only a partial solution to the drawbacks mentioned above.

The substantially spherical shape of the filtration adjuvant particles necessitates the use of relatively large (>100 μm) particles to obtain acceptable permeability of the cake, and this leads to a thicker filter medium. Moreover, the filtration efficiency is generally insufficient.

What is more, the degree of regeneration achieved by the conventional techniques still proves unsatisfactory.

SUMMARY OF THE INVENTION

A main aim of the invention is to remedy the major part of these drawbacks by proposing new filtration adjuvants that can be regenerated to a satisfactory degree without using special-purpose installations.

Another aim of the invention is to propose a new filtration process using the new filtration adjuvants of the invention and producing a liquid meeting current quality requirements.

A further aim of the invention is to propose a new process for regenerating filtration adjuvants.

A final aim of the invention is to propose new filtration supports suitable for use with the filtration adjuvants of the invention.

The new filtration adjuvants of the invention that can be regenerated and that can be used for the filtration of liquids, in particular beer at the end of the secondary fermentation storage, comprise incompressible synthetic or natural polymer grains or incompressible natural grains having a sphericity coefficient varying between approximately 0.6 and approximately 0.9.

In the context of the present invention, the sphericity coefficient is defined by the method described in "Particle size measurement", T. Allen, p. 76–77, Chapman and Hall Ed., London 1974.

The new filtration adjuvants of the invention preferably have an average grain size varying between approximately 20 $\mu$m and approximately 70 $\mu$m, forming a filter cake having a porosity between approximately 0.4 and approximately 0.8 and a density varying between approximately 1000 kg/m$^3$ and approximately 1500 kg/m$^3$.

In the context of the present invention, the porosity of the filter cake is determined by the method described by R. Leenaerts in La Filtration Industrielle des Liquides, Volume 1, Chapter 2, Societe Belge de Filtration Ed., 1974.

The new filtration adjuvants of the invention preferably have an average grain size varying between approximately 20 $\mu$m with a standard deviation of approximately 10 $\mu$m and approximately 70 $\mu$m with a standard deviation of approximately 25 $\mu$m.

The filtration adjuvants of the invention preferably have an average grain size of approximately 35 $\mu$m with a standard deviation of approximately 15 $\mu$m and a density of approximately 1200 kg/m$^3$.

The filtration adjuvants of the invention form the framework of a porous medium which traps the impurities as they are deposited on its surface without clogging instantaneously. To achieve this, bridging must occur between the filter adjuvant particles so that the impurities lodge in the deep cavities between the particles without being deformed or participating in the structure of the granular medium.

Obtaining a porous medium of adequate porosity depends on the use of a filtration adjuvant with a shape that promotes the formation of contact surfaces between the particles with particle sizes in a sufficiently narrow range to avoid an excessive distribution of pore sizes.

The filtration adjuvants of the invention are in the form of grains, somewhere between the fibrous and compressible form of kieselguhr type filtration adjuvants and the practically spherical shape of the synthetic ball filtration adjuvants of the prior art which produce cakes of low porosity.

In one preferred embodiment of the invention, the filtration adjuvants of the invention comprise incompressible synthetic or natural polymer grains or incompressible natural grains made from, for example, polyamide, polyvinylchloride, fluorinated products such as TEFLON®, polypropylene, polystyrene, polyethylene, certain derivatives of silica, for example ryolites or glass, and mixtures thereof.

Polyamides that can be used in the context of the present invention include, for example, and without limiting the invention: polycaprolactam, poly(hexamethylene adipamide), poly(hexamethylene nonanediamide), poly (hexamethylene sebacamide), poly(hexamethylene dodecanodiamide), polyundecanolactam, polylauryllactam and/or mixtures thereof.

The above polyamides belong to the family of products sold under the trademark NYLON®.

In one particularly preferred form of the invention the polyamide constituting the main ingredient of the filtration adjuvants of the present invention is polyundecanolactam.

The filtration adjuvants of the present invention are preferably of foodstuffs grade and resistant to dilute acid and alkaline solutions. They also have sufficient resistance to abrasion, to the regeneration agents and to temperatures in the order of 100° C. They are also undeformable due to the effect of the filtration pressure.

The invention also consists in a new process for filtering liquids.

The process for filtering a liquid, for example beer at the end of the secondary fermentation storage, comprising steps of de-aeration, depositing a preliminary layer onto a filtration support and recirculation, is characterized in that the filtration step is carried out using a filtration adjuvant of the present invention.

The relative proportions of the filtration adjuvant and the liquid to be filtered preferably vary between approximately 25 g of filtration adjuvant/hl of liquid and approximately 250 g of filtration adjuvant/hl of liquid.

The filtration process of the invention comprises the same steps as filtration using kieselguhr up to the end of the nachlauf step. The term "nachlauf" is generally used for the step, following the filtration cycle, of washing the beer out of the filter medium with water.

These steps including de-gassing or de-aeration of the filter comprising the filter medium and the filter apparatus. A preliminary layer is deposited onto the filter support by the conventional technique, i.e. at a flowrate close to 25 hl/hm$^2$.

The water filling the filter is then removed on passing the beer containing the filtration adjuvant into the vorlauf stage. When the composition of the water-beer mixture is satisfactory, the filtration step starts and the filtrate obtained is then passed to the bottling unit.

In one preferred embodiment of the invention, the process further includes a stabilization step. This step can be carried out during or after the filtration step proper, using filtration adjuvants conventionally employed, including silica gels, gallic tannins, etc. If the stabilization is carried out after the filtration, proteolytic enzymes and polyvinylpyrrolidone (PVPP) are generally used, preferably in a form that can be regenerated.

The stabilization is advantageously carried out concomitantly with the filtration.

In a preferred embodiment of the present invention the filtration process further includes a step of regenerating the filtration adjuvant in situ.

In accordance with the invention, this step of regenerating the filtration adjuvant in situ comprises the steps of:

washing the filter medium with a soda solution at a concentration varying between approximately 2% and approximately 5% and at a temperature of at least approximately 80° C. for between approximately 60 minutes and approximately 120 minutes, and treating the filter medium with an enzyme composition at a temperature varying between approximately 40° C.

and approximately 60° C. for between approximately 100 minutes and approximately 200 minutes, said enzyme treatment being carried out after a plurality of filtration cycles.

The enzyme composition advantageously includes proteases and agents capable of lysing yeasts.

Non-limiting examples of enzyme compositions that can be used in the context of the present invention include the product sold under the tradename SP299 by the Danish company Novo and the product YLE® sold by the Japanese company Amano.

Enzyme catalyst agents may be added to the enzyme composition to render it more effective.

On the subject of enzyme treatment of the filtration adjuvant, note that this treatment is not necessarily carried out at the end of each filtration cycle, but only when the pressure rise in the filter during the filtration cycle becomes excessive.

The enzyme treatment is preferably carried out when the hourly pressure rise becomes excessive and significantly higher than with a filtration adjuvant that is not spent, i.e. a fresh or totally regenerated filtration adjuvant.

The enzyme treatment is carried out, for example, when the pressure rise in the filtration tank reaches approximately 80% of the maximal pressure authorized by the mechanical structure of the filter, either in a period of time significantly shorter than with a filtration adjuvant that is not spent, or with a volume of filtered beer significantly smaller than with a filtration adjuvant that is not spent.

When the filtration process of the invention includes a stabilization step, the regeneration of the filtration adjuvant also regenerates the stabilizing agent, for example the PVPP.

The filtration process of the present invention therefore enables beer to be made meeting clarity and stability requirements and also enables the filtration adjuvant to be regenerated directly in the filtration tank without having to be transported and without having to modify existing installations.

The filtration process of the invention may be used with various filtration supports.

In a first embodiment the filtration is carried out using multiple tube filters, already widely used in the brewing industry. The multiple tube filters that can be used to implement the process of the invention comprise a wire wound in a spiral around a vertical support, the distance between two turns varying between approximately 20 $\mu$m and approximately 70 $\mu$m, preferably between approximately 20 $\mu$m and approximately 45 $\mu$m.

The wire is advantageously made from a foodstuffs grade material, resistant to the reagents used in the filtration process. In a particularly advantageous form, the wire wound in a spiral is trapezoidal in cross-section, the longer base of the trapezium facing towards the outside of the filter, towards the material to be filtered. Accordingly, particles contained in the beer having a size less than the distance between the turns pass through the filter, with no risk of them becoming trapped between turns and thereby blocking the filter, the dimensions of the passage between the turns beyond its inlet being larger than the distance between two turns.

Non-limiting examples of multiple tube filters that can be used include the "Trislot" type products sold by the Belgian company Bekaert.

In another embodiment of the present invention the filtration support comprises screens, preferably horizontal screens also known as plate filters, with a mesh size varying between approximately 10 $\mu$m and approximately 70 $\mu$m, preferably between approximately 10 $\mu$m and approximately 20 $\mu$m.

As previously, the plate filters are made from a foodstuffs grade material resistant to the solvents and reagents used in filtration.

One non-limiting example of the screens that can be used is the M15 type screen sold by the Belgian company South West Screen.

The invention also concerns a new process for regenerating filtration adjuvants in situ, novel in itself and usable among other things to regenerate the filtration adjuvants of the invention.

The regeneration process of the invention is characterized in that it comprises the following steps:

washing the filter medium with a soda solution at a concentration varying between approximately 2% and approximately 5% and at a temperature of at least approximately 80° C. for between approximately 60 minutes and approximately 120 minutes, and treating the filter medium with an enzyme composition at a temperature varying between approximately 40° C. and approximately 60° C. for between approximately 100 minutes and approximately 200 minutes, said enzyme treatment being carried out after a plurality of filtration cycles.

In accordance with the invention, the enzyme composition includes proteases, agents capable of lysing yeasts, and possibly enzyme catalyst agents, as defined above.

The in situ regeneration process of the invention is particularly well suited to regenerating the new filtration adjuvants of the invention, but is not limited to specific filtration adjuvants or to the filtration process of the invention described above.

The invention finally concerns new filtration supports.

In a first embodiment, the filtration supports of the invention are characterized in that they consist of multiple tube filter elements comprising a wire made from a foodstuffs grade material resistant to the reagents used in the filtration process wound in a spiral about a vertical support, the distance between two turns varying between approximately 20 $\mu$m and approximately 70 $\mu$m, preferably between approximately 20 $\mu$m and approximately 45 $\mu$m, and having the trapezoidal shape defined above.

In another embodiment the filtration supports of the invention are characterized in that they consist in screens, preferably horizontal screens, made from foodstuffs grade materials resistant to the reagents used in the filtration process and with a mesh size varying between approximately 10 $\mu$m and approximately 70 $\mu$m, preferably between approximately 10 $\mu$m and approximately 20 $\mu$m.

The new filtration supports of the invention are particularly well suited to implementation of the filtration process of the invention, but their use is not limited to this particular process.

DETAILED DESCRIPTION OF THE PREFERRED EMBODIMENT(S)

Further advantages and features of the invention will emerge from the more detailed description that follows of embodiments of the invention given by way of purely illustrative and non-limiting example.

Example

1) Installation

The filtration adjuvant used was Nylon 11, sold under the tradename RILSAN® by the French company Atochem.

The multiple tube filter used had a conical feed area and a cylindrical portion 215 mm in diameter and 2.05 m high. Three multiple tube filter elements 32 mm in diameter with their interior communicating with the filtrate recovery area were suspended in the cylinder. The height of the multiple tube filter elements was 1.5 m and the distance between their axes was 86 mm, to deposit a cake 25 mm thick at most, retaining a distance of 15 mm between the surface of the cake and the wall of the cylinder. The total volume of the filter was 78 1 and the filtration area was 0.45 m$^2$. The cut-off threshold of the multiple tube filter elements was 30 μm and the wire had a trapezoidal cross-section.

2) Filtration 2.1) Deposition of the preliminary layer

The installation was first sterilized and de-aerated before depositing the preliminary layer, which was fed in at a flowrate of 20 hl/hm$^2$ to 30 hl/hm$^2$, and in the same manner as in an industrial filter. The wort suspension containing the RILSAN® was injected for seven minutes on average, and recirculation for 15 minutes was sufficient to deposit all of the filtration adjuvant. If the stabilization of the beer were effected at the same time as the filtration, the preliminary layer would comprise a mixture of RILSAN® and PVPP sold by the American company Gaf.

In this case, the relative proportions of the two ingredients (PVPP/RILSAN®) were the same as for "alluvion" filtering, i.e. from 2/1 to 1/4 by weight so that, after demounting, the composition of the regenerated filter mass was not altered. Independently of the addition of PVPP, the preliminary layer concentration reached 1.5 kg/m$^2$ to 2 kg/m$^2$, values above those usually recommended but which represent a cake thickness similar to that obtained with traditional filtration adjuvants.

2.2) Filtration

The filtration flowrate depends on the pressure rise and on the contact time needed to obtain sufficient stabilization. To achieve this, PVPP stabilization installations operate at a flowrate of approximately 10 hl/hm$^2$.

A first trial carried out on a plate filter with a Pils type beer containing one million yeasts/ml to which was added a mixture of 25 g/hl to 200 g/hl of RILSAN® and 50 g/hl of PVPP caused a pressure rise varying between 15,000 N.m$^{-2}$/h and 30,000 N.m$^{-2}$/h, depending on the composition of the mixture, the PVPP accounting for between 20% and 67% by weight of the total deposit. For exactly the same concentration of kieselguhr, a pressure rise in excess of 80,000 N.m$^{-2}$/h was observed under the same conditions.

A second trial was carried out using a Pils type darauflassen beer with 300,000 yeast/ml after centrifuging. For a total deposit concentration of 150 g/hl (100 g/hl of filtration adjuvant and 50 g/hl of PVPP), the pressure difference between the filter inlet and outlet was 50 000 N.m$^{-2}$ after 20 hours of filtration at a flowrate of 10 hl/hm$^2$.

At the same flowrate of 10 hl/m$^2$ and for the same deposit concentration, a beer containing five million yeasts per ml produced a pressure rise of 35,000 N.m-$^{-2}$/h.

2.3) Beer quality

The clarity of the beer after filtration met the applicable standards. It was much lower than 0.7° EBC, the recommended value, and in trials carried out at low temperature was less than 0.5° EBC. Values of 0.3° EBC were regularly measured.

The sterility of filtration was verified by filtering 0.5 1 samples on a cellulose nitrate membrane with a cut-off threshold of 0.45 μm. The membrane was seeded with an agar extract malt type culture medium and incubated at 30° C. for five days. A threshold of 0 yeast/0.5 1 was obtained at the end of the vorlauf step.

Comparing the characteristics of the beer before and after filtration, and without regard to the filtration adjuvant concentration, no adsorption by the filtration adjuvant of the invention was detectable, in particular with regard to the color and the concentration of isohumulones. Moreover, adding 50 g/hl of PVPP to the deposit reduced the total polyphenols concentration by 50% even in the presence of yeasts.

Two reference beers, one filtered by the process of the invention and the other by a conventional process, were tasted by a group of eight experts. No significant taste difference was detected.

The results obtained are summarized in table I appended to this patent application.

2.4) Regeneration

Washing of the filter mass in the filtration rig without demounting and using a 2% soda solution at a temperature of 80° C. reduced the size of the yeasts by 40% after two hours treatment.

The waste was still too coarse to be eliminated from the cake merely by washing and its accumulation caused an increase in the pressure rise during filtration. Thus for one beer, initially containing one million yeasts/ml, filtered at a flowrate of 10 hl/hm$^2$ in the presence of 50 g/hl of RILSAN® and 50 g/hl of PVPP, the pressure rise varied by a factor of three after five cycles.

Enzyme treatment remedied this, reducing the size of the yeasts 25% to 35% after two to three hours treatment.

The enzyme treatment was carried out by washing the filter mass using an enzyme solution sold under the tradename YLE® by Amano. The enzyme treatment was carried out at a pH of 5 to 6 and a temperature of 50° C. after the soda treatment, which entailed adjusting the pH and the temperature to the above values.

The waste products of this lysis were then eliminated by a second soda wash. The period of enzyme treatment depends on the initial yeast content of the beer prior to filtration, the type of filter used and the required cycle length.

COMPARATIVE EXAMPLE

The volumes of beer filtered by the process of the invention and by a conventional filtration process were compared by extrapolation on a filtration unit comprising a single multiple tube filter. In this comparative test, the filtration area was 80 m$^2$ and deposited a 3 m$^3$ cake with a distance of 5 mm between the cakes deposited on the multiple tube filter elements at the end of filtration.

The beer was assumed to contain one million yeasts/ml before filtration and the filtration flowrate was 10 hl/hm$^2$. The volume filtered per cycle was calculated so that the space left for the slurry was totally filled at the end of the cycle and the final pressure difference did not exceed 400 000 N.m$^{-2}$, a value allowing a high counter-pressure.

For a given deposit concentration (a), the volume filtered per cycle (Vf) was calculated from the space for the cake (3 m$^3$) and the filtration adjuvant concentration of the preliminary layer (ap), using the expression:

$$Vf = \frac{(3\rho GS - 80ap)}{a}$$

in which PGS is the apparent density of the cake.

The final pressure was then calculated using the law for cylindrical filtration at constant flowrate, as described by J. Hermia et al. in Filtration and Separation, 1994, 31, 721–725.

The results are summarized in table II appended to this patent application.

In table II, $a_p$ represents the weight of filtration adjuvant per square meter, a represents the weight of filtration adjuvant per hl of beer, $\rho_{GS}$ represents the apparent density of the cake, $\Delta P$ represents the head loss of the cake, $t_f$ represents the filtration time and Vf represents the filtered volume.

Apart from the advantage of enabling regeneration of the filter mass in situ, the new process of the invention can filter generally greater volumes of beer than the conventional processes.

It goes without saying that the invention is in no way limited to the embodiments just described above by way of purely illustrative and non-limiting example, but to the contrary encompasses all variants thereof.

Accordingly, although the invention has been described above with particular reference to the use of the "alluvion" filtration technique, the new filtration adjuvants and supports of the invention and the filtration and regeneration processes of the invention can be used with equal efficiency in the "pre-layer" filtration technique.

Modifications to the present invention will suggest themselves to the person skilled in the art, as part of the implementation of the invention, that do not depart from the scope of its characteristic features as defined in the following claims.

Appendix

TABLE I

Filtered beer characteristics

| | Trial with RILSAN ® only | | Trial with RILSAN ®/PVPP mixture | |
|---|---|---|---|---|
| | Unfiltered beer | Filtered beer | Unfiltered beer | Filtered beer |
| Color (EBC) | 6.2 | 6.1 | 5.4 | 5.0 |
| Isohumulones (EBU) | 23.1 | 22.8 | 23.3 | 22.9 |
| Polyphenols (mg/l) | 196 | 184 | 200 | 90 |

TABLE II

Filtered volumes according to deposit type

| | Kieselguhr | RILSAN ® only | RILSAN ®/PVPP |
|---|---|---|---|
| $a_p$ (kg/m²) | 1 | 2 | 2 |
| a (g/hl) | 100 | 80 | 50 + 50 |
| $\rho_{GS}$ (kg/m³) | 325 | 480 | 350 |
| $\Delta P$ (N · m⁻²) | 360 000 | 40 000 | 90 000 |
| $t_f$ (h) | 12.0 | 14.9 | 11.1 |
| vf (hl) | 8 950 | 14 870 | 8 900 |

What is claimed is:

1. Method of regenerating a filtration adjuvant comprising synthetic polymer or natural grains or natural grains incompressible by the filtration pressure having a sphericity coefficient varying between approximately 0.6 and approximately 0.9, an average grain size between approximately 20 μm and approximately 70 μm, adapted to form a filter cake having a porosity between approximately 0.4 and approximately 0.8 and a density varying between approximately 1000 kg/M³ and 1500 kg/m³, the adjuvant being charged with organic impurities which includes yeasts and which are trapped in the cavities between the adjuvant grains after filtering a liquid charged with said impurities, and being deposited on a filtration support of a filtration installation, the method including the steps of:

washing the filtration adjuvant with a soda solution at a concentration between approximately 2% and approximately 5% at a temperature of at least approximately 80° C. for between approximately 60 minutes and approximately 120 minutes;

carrying out the washing step in situ with said soda solution by passing the soda solution through the filtration installation in the washing direction identical to the direction of the liquid to be filtered;

passing through the filtration installation in the washing direction an enzyme composition at a temperature between approximately 40° C. and approximately 60° C. for between approximately 100 minutes and approximately 200 minutes, said enzyme composition including agents capable of lysing yeasts;

washing said filtration adjuvant to eliminate therefrom the organic impurities waste products the size of which has been reduced sufficiently to make possible said elimination, said washing step being a second washing with a soda solution to eliminate waste products produced by the enzymatic composition passing step; and removing grains of the adjuvant accumulated on the filtration support to clean said filtration support and to use said grains of adjuvant for a new filtration operation.

2. Regeneration method according to claim 1 characterized in that the enzyme composition includes proteases, agents capable of lysing yeasts and possibly enzyme catalyst agents.

3. Regeneration method according to claim 1 characterized in that the enzyme passing step is carried out when the hourly pressure rise becomes excessive and significantly higher than with a filtration adjuvant that is not spent.

4. Regeneration method according to claim 3 characterized in that the enzyme passing step is carried out when the pressure rise in the filtration installation reaches approximately 80% of the maximal pressure authorized by the mechanical structure of the filter.

5. Regeneration method according to claim 1 further including the step of bringing the adjuvant to a temperature between 40° C. and 60° C. and a pH between 5 and 6 after said washing step and before said enzyme passing step.

6. Regeneration method according to claim 1 characterized that the adjuvant has an average grain size between approximately 20 μm with a standard deviation of approximately 10 μm and approximately 70 μm with a standard deviation of approximately 25 μm.

7. Regeneration method according to claim 6 characterized in that the adjuvant has an average grain size of approximately 35 μm with a standard deviation of approximately 15 μm and a density of approximately 1200 kg/m³.

8. Regeneration method according to claim 4 characterized in that the synthetic polymer grains are made from the group consisting of polyamide, polyvinylchloride, fluorinated products, polypropylene, polystyrene, polyethylene, derivatives of silica, ryolites or glass, and mixtures thereof.

9. Regeneration method according to claim 8 characterized in that the polyamide grains are selected from the group consisting of polycaprolactam, poly(hexa-methylene adipamide), poly(hexamethylene nonanediamide), poly (hexamethylene sebacamide), poly(hexamethylene dodecanodiamide), polyundecanolactam, polylauryllactam and mixtures thereof.

10. Regeneration method of claim 1 characterized in that said method is used to regenerate grains of filtration adjuvant also including substantially spherical balls or made up of virtually spherical balls.

11. Regeneration method according to claim 1 characterized in that the filtration adjuvant is mixed with an agent for stabilizing the drink to be filtered.

12. Regeneration method according to claim 11 wherein said stabilizing agent is PVPP.

13. Alluvion filtration process for filtering a liquid charged with impurities in order to prepare a drink, using a filtration adjuvant comprising synthetic polymer or natural grains or natural grains incompressible by the filtration pressure having a sphericity coefficient varying between approximately 0.6 and approximately 0.9, an average grain size between approximately 20 $\mu$m and approximately 70 $\mu$m, adapted to form a filter cake having a porosity between approximately 0.4 and approximately 0.8 and a density varying between approximately 1000 kg/$^3$ and 1500 kg/$^3$ including the steps of mixing the adjuvant with said liquid to be filtered, depositing said adjuvant on a filtration support of a filtration installation as it becomes charged with organic impurities includes yeasts during an operation of filtering said liquid, and regenerating in situ said adjuvant after one or more filtration operations using the method of claim 1.

* * * * *